United States Patent [19]
Bräckelmann et al.

[11] Patent Number: 5,645,102
[45] Date of Patent: Jul. 8, 1997

[54] LEAK RESISTANT, SWITCHING, DOUBLE VALVE SYSTEM

[75] Inventors: Wolfgang Bräckelmann, Unna-Uelzen; Norbert Schramm, Unna; Frank Baumbach, Soeset, all of Germany

[73] Assignee: APV Rosista GmbH, Unna-Königsborn, Germany

[21] Appl. No.: 308,920

[22] Filed: Sep. 20, 1994

[30]     Foreign Application Priority Data

Sep. 21, 1993 [EP] European Pat. Off. .............. 93115203

[51] Int. Cl.⁶ ........................ F16K 11/20; F16K 31/122; B08B 9/02
[52] U.S. Cl. .................... 137/238; 137/240; 137/312; 137/614.19; 134/166 C
[58] Field of Search ...................... 137/240, 312, 137/614.17, 614.18, 614.19; 134/166 C

[56]     References Cited

U.S. PATENT DOCUMENTS

| | | | |
|---|---|---|---|
| 4,304,251 | 12/1981 | Schadel et al. | 137/240 |
| 4,360,039 | 11/1982 | Jeppsson | 137/240 |
| 4,368,753 | 1/1983 | Brakelmann et al. | 137/240 |
| 4,460,014 | 7/1984 | Mases et al. | 137/240 |
| 4,605,035 | 8/1986 | Rasmussen et al. | 137/240 |
| 4,617,955 | 10/1986 | Melgaard | 137/240 |
| 4,655,253 | 4/1987 | Ourensma | 137/240 |
| 4,687,015 | 8/1987 | Mieth | 137/240 |
| 4,757,834 | 7/1988 | Mieth | 137/240 |
| 4,856,551 | 8/1989 | Brakelmann et al. | 137/240 |

FOREIGN PATENT DOCUMENTS

| | | |
|---|---|---|
| 0215293 | 9/1979 | Argentina . |
| 0174384 | 3/1986 | European Pat. Off. . |
| 0208126 | 1/1987 | European Pat. Off. . |
| 0140432 | 1/1991 | European Pat. Off. . |
| 0545846 | 6/1993 | European Pat. Off. . |
| 3030989 | 2/1982 | Germany . |
| 4118874 | 12/1992 | Germany . |

*Primary Examiner*—George L. Walton
*Attorney, Agent, or Firm*—Nils H. Ljungman and Associates

[57]     ABSTRACT

A leak resistant, switching, double valve system consists of two sliding valve bodies in a valve housing with connecting lines. The two sliding valve bodies, which can be actuated independently of one another, are in contact in the closed position with valve seats in the valve housing, and are located at some distance one behind the other, forming a leak cavity between them. During the opening process, the first sliding valve body, before it leaves its valve seat, while simultaneously reducing the size of the leak cavity, can be placed in contact with the second sliding valve body, which is provided with a tubular extension which exits the valve housing in a sealed manner and connects the leak cavity to the environment of the valve system. With such a double valve system, the invention teaches that an optimal cleaning can be performed with minimal consumption of flushing agent, because the two sliding valve bodies can be moved independently of one another, each by a partial stroke opposite to the direction of the opening motion, into a flushing position, in which the sliding valve body is free from its valve seat and is in contact with a housing stop provided with flushing agent passages.

20 Claims, 4 Drawing Sheets

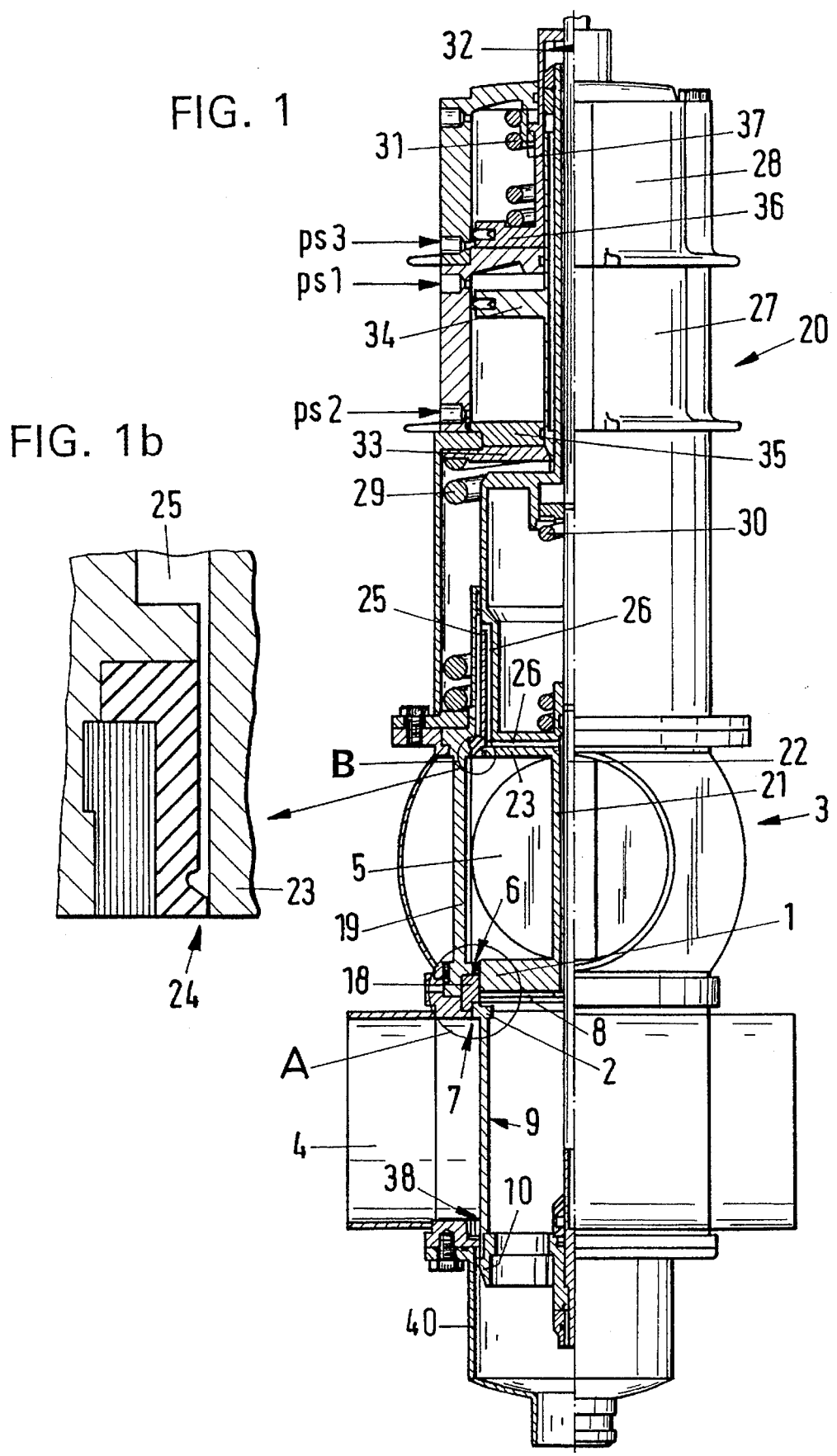

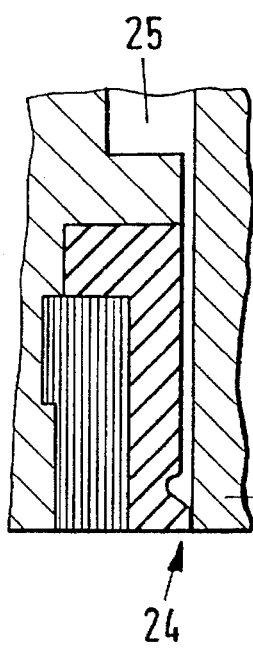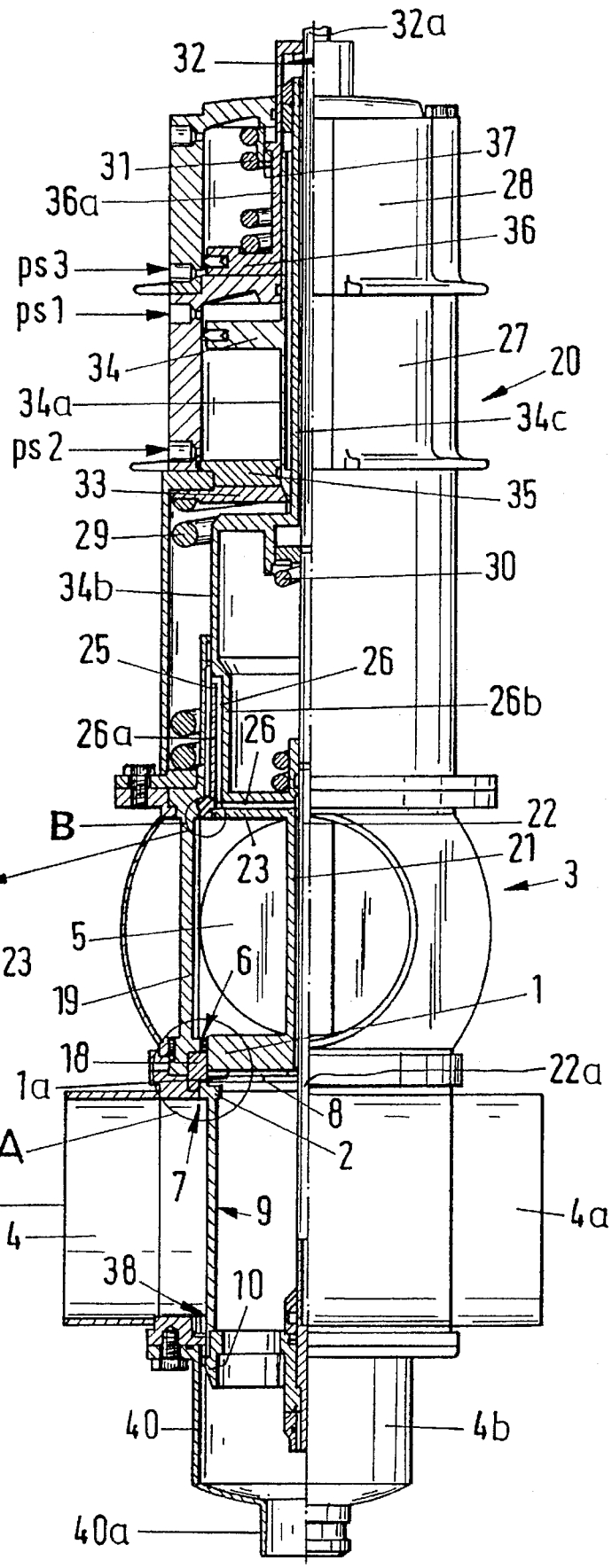

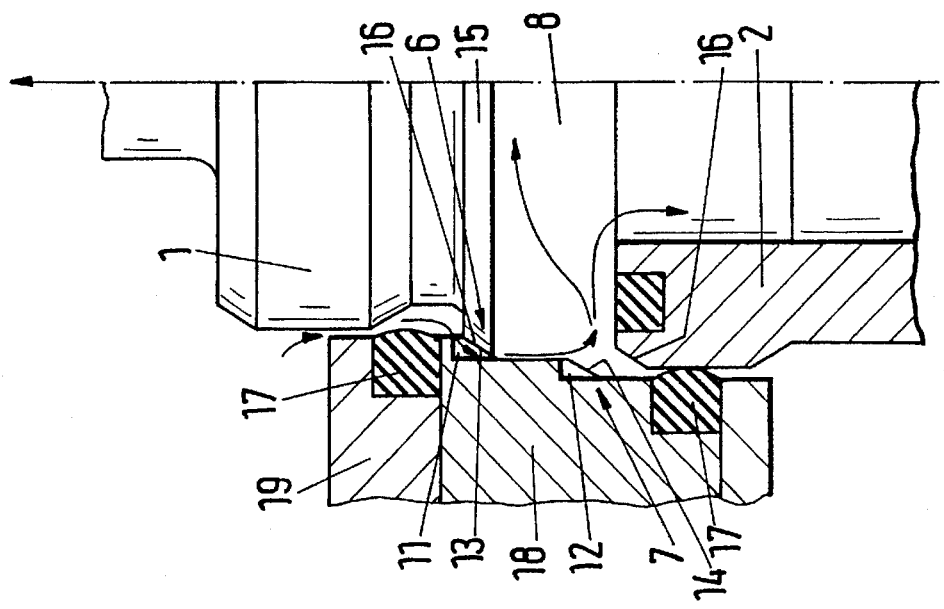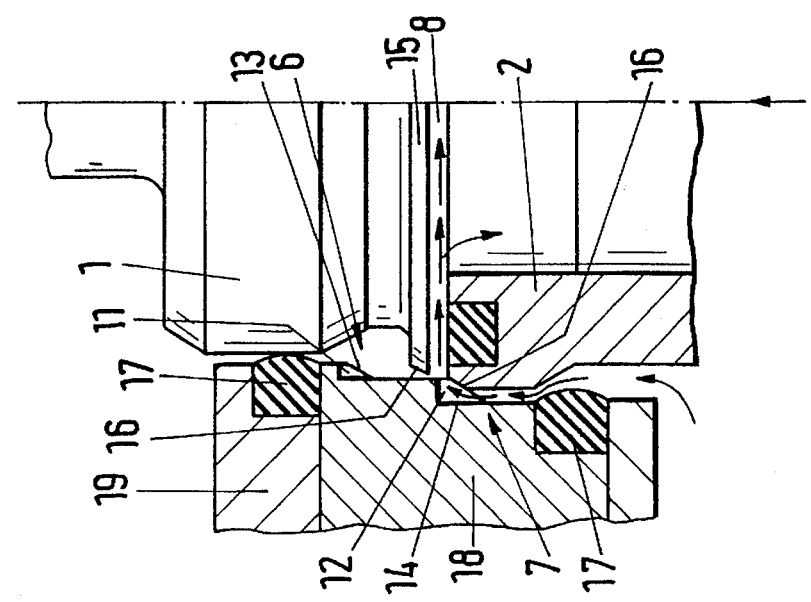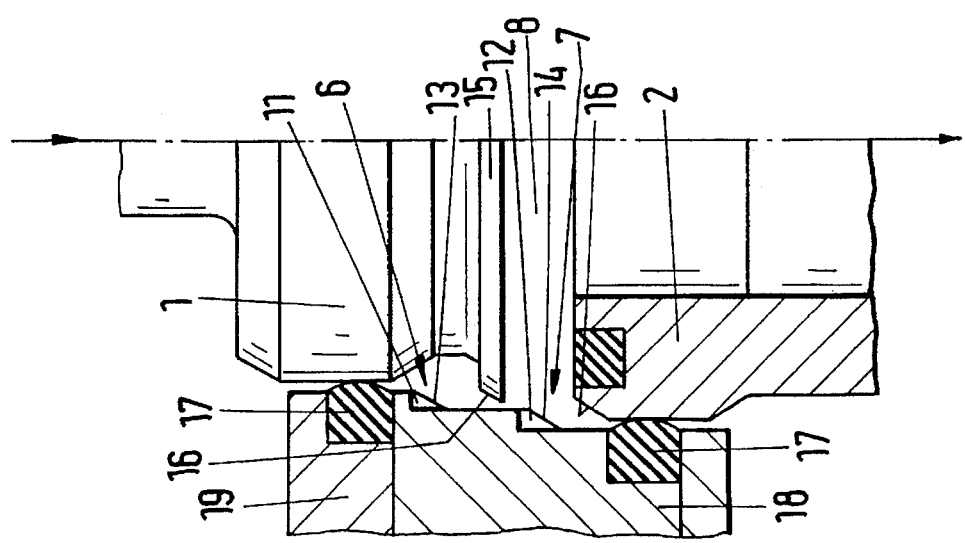

5,645,102

LEAK RESISTANT, SWITCHING, DOUBLE VALVE SYSTEM

BACKGROUND OF THE INVENTION

1. Field of the Invention

This invention relates to a leak-resistant, switching, double valve system, the valve system having two sliding valve bodies located in a valve housing with line connections. The two sliding valve bodies, which are independent of one another, when they are in the closed position, are in contact with valve seats in the valve housing. The two valve bodies are located one behind the other and at some distance from one another, and form a leak cavity between them. During the opening process, the first sliding valve body, before it leaves its corresponding valve seat, can be placed in contact with the second sliding valve body, thereby reducing the size of the leak cavity. Further, the second sliding valve body is provided with a tubular extension, which tubular extension exits the valve housing in a sealed manner and connects the leak cavity with the environment of the valve system.

2. Background Information

Such a double valve system is disclosed in DE 41 18 874 A1, wherein significant amounts of flushing agent are required for cleaning, because the two sliding valve bodies are still in contact with their corresponding valve seats, even in the flushing position.

OBJECT OF THE INVENTION

The object of the present invention is to design a double valve system of the type described above, so that the double valve system can be cleaned properly, preferably using the smallest possible amount of flushing agent.

SUMMARY OF THE INVENTION

The present invention teaches that this object can be achieved if the two sliding valve bodies can be moved independently of one another into a flushing position, preferably by means of a partial stroke in the direction opposite to the opening movement. In the flushing position, the sliding valve bodies are free from their corresponding valve seats, and are preferably in contact with housing stops provided with flushing agent passages.

The present invention thereby takes advantage of the known fact that the sliding valve bodies and their corresponding valve seats can be cleaned more rapidly and more effectively if the sliding valve bodies are free from their corresponding valve seats. This optimization is possible using the smallest possible amount of flushing agent as claimed by the present invention essentially preferably only if, in the flushing position, the sliding valve bodies are in contact with housing stops provided with flushing agent passages, by means of which passages the amount of flushing agent can be optimally adjusted.

There are numerous possibilities for additional configurations in accordance with the present invention. In one preferred embodiment, for example, the first sliding valve body can preferably have a smaller diameter than the second sliding valve body. From a design point of view, favorable conditions result if, as in one preferred embodiment, the first sliding valve body, on the side facing the second sliding valve body, preferably has a stop flange edge for the corresponding housing stop and/or both sliding valve bodies each have a stop bezel for the corresponding housing stop. Also, the valve seats can preferably be provided with gaskets which are held by housing insets or recesses, which can make it easier to replace the gaskets.

The two sliding valve bodies can be advantageously actuated, preferably from one side, by means of a valve actuation system. For the purpose of actuation, a system in which the first sliding valve body is actuated by a hollow rod in which there is a second actuator rod for the actuation of the second sliding valve body can preferably be utilized. In accordance with a preferred embodiment of the present invention, the first sliding valve body, preferably on the side opposite the second sliding valve body, and at some distance away, can have a sealing cylinder. The sealing cylinder, in the flushing position, can be flushed along with its seal seat through a preferably toroidal chamber. The toroidal chamber is preferably in communication with the leak cavity by means of a connecting line, which connecting line preferably runs between the hollow rod and the actuation rod. The sealing cylinder can preferably have the same surface area as the first sliding valve body, preferably to prevent the opening of the valve in the event of pressure shocks.

In summary, one aspect of the invention resides broadly in a double valve, the valve comprising: a valve housing; a first valve body disposed within the valve housing; a second valve body disposed within the valve housing; the first valve body and the second valve body being slidably displaceable; the first valve body and the second valve body being slidably displaceable together to provide a closed position and an open position of the valve; a first valve seat disposed within the valve housing; the first valve body being in contact with the first valve seat in the closed position; a second valve seat disposed within the valve housing; the second valve body being in contact with the second valve seat in the closed position; the first valve body being slidably displaceable between the closed position and a flushing position of the first valve body; the second valve body being slidably displaceable between the closed position and a flushing position of the second valve body; at least one input and at least one output; the first valve body and the first valve seat and the second valve body and the second valve seat being disposed in tandem such that at least a substantial portion of any flow between the at least one input and the at least one output which flows through the first valve seat also flows through the second valve seat; the first valve body and the first valve seat and the second valve body and the second valve seat being disposed between the at least one input and the at least one output for permitting flow and stopping flow between the at least one input and the at least one output; a cavity; the cavity being disposed between the first valve body and the second valve body; the cavity comprising a leak cavity to minimize leakage between the first valve body and the first valve seat leaking between the second valve body and the second valve seat, and to minimize leakage between the second valve body and the second valve seat leaking between the first valve body and the first valve seat, and for permitting leakage entering the cavity to exit the valve housing; first means for moving the first valve body in a first direction of movement from the closed position to the open position; second means for moving the first valve body in a second direction of movement from the closed position to the flushing position thus freeing the first valve body from the first valve seat; the second direction of movement being opposite to the first direction of movement; third means for moving the second valve body in a third direction of movement from the closed position to the open position; fourth means for moving the second valve body in a fourth direction of movement from the closed position to the flushing position thus freeing the second valve body from the second valve seat; and the fourth direction of movement being opposite to the third direction of movement.

BRIEF DESCRIPTION OF THE DRAWINGS

The invention is explained in greater detail below on the basis of an embodiment illustrated in the accompanying drawings, in which:

FIG. 1 shows a double valve system, namely a sectional view in one half of the figure and a side view in the other half of the figure; and FIG. 1b shows Section B from FIG. 1 on a larger scale;

FIG. 1a shows substantially the same view of a double valve system as shown in FIG. 1;

FIG. 1c shows Section B from FIG. 1a on a larger scale;

FIGS. 2a, 2b and 2c show Section A from FIG. 1 on a larger scale, in three different operating positions.

DESCRIPTION OF THE PREFERRED EMBODIMENTS

Figure 2D:
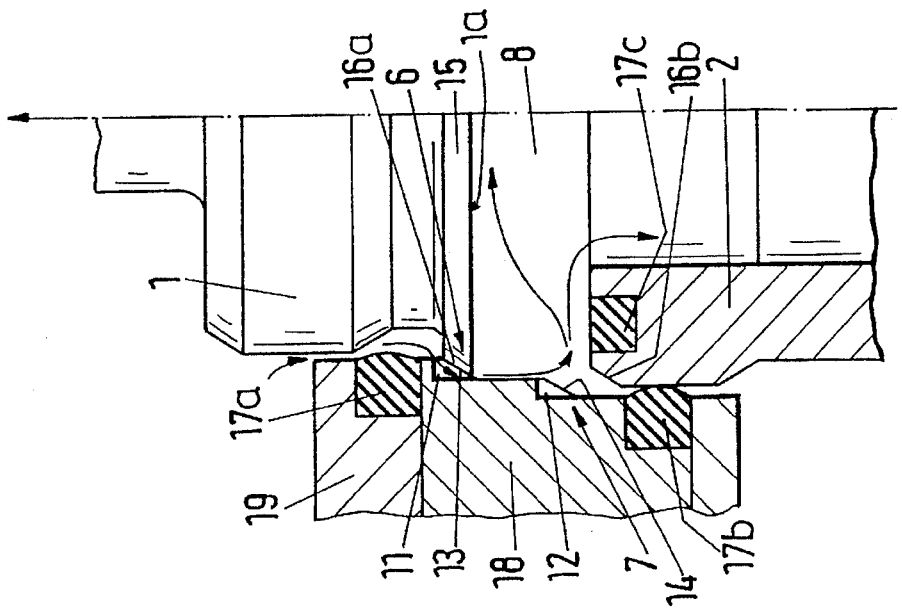
FIGS. 2d, 2e and 2f show substantially the same views as FIGS. 2a, 2b and 2c.

The non-leaking switching double valve system illustrated in the figures generally includes two sliding valve bodies 1, 2 preferably in a valve housing 3 with line connections 4, 5. The two sliding valve bodies 1, 2 can preferably be actuated independently of one another, and in the closed position are preferably in contact with their corresponding valve seats 6, 7 in the valve housing 3. The two valve bodies 1, 2 are shown in contact with their corresponding valve seats 6, 7 in FIGS. 1 and 2a. The two sliding valve bodies 1, 2 are preferably located at some distance from one another, and are located one behind the other. The two valve bodies 1, 2 can thereby preferably form a leak cavity 8 between them.

During the opening process, the first sliding valve body 1, preferably before it leaves valve seat 6, can be brought into contact with the second sliding valve body 2, simultaneously reducing the size of the leak cavity 8. The second sliding valve body 2 can preferably be provided with a tubular extension 9, which tubular extension 9 preferably exits the valve housing 3 in a sealed manner. The tubular extension 9 preferably connects the leak cavity 8 to the environment of the valve system. The free end 10 of the tubular extension 9 can preferably empty into a discharge tube 40, which discharge tube 40 preferably protects the extension 9, and can also act as the combined discharge line for the flushing agent.

Both sliding valve bodies 1, 2 can be moved independently of one another, preferably by means of a partial stroke in the direction opposite to the opening movement, which opening movement will be described further below, into a flushing position in which the sliding valve body 1 or 2 is preferably free from its respective seat 6 or 7, and is preferably in contact with its corresponding housing stop 13 or 14, respectively. The housing stops 13, 14 can preferably be provided with flushing agent passages 11, 12, respectively, as shown in FIG. 2b and FIG. 2c.

In accordance with at least one embodiment of the present invention, the flushing agent passages 11, 12 preferably permit flushing agent to make contact with stop bezels 16 (see FIGS. 2a, 2b, and 2c) or 16a and 16b (see FIGS. 2d, 2e and 2f) of each valve body 1, 2, respectively.

The first sliding valve body 1 can preferably have a smaller diameter than the second sliding valve body 2.

Further, the first sliding valve body 1 can preferably be provided, on the side facing the second sliding valve body 2, with a stop flange edge 15 preferably for the corresponding housing stop 13. The two sliding valve bodies 1, 2 can also each have the stop bezel 16, as discussed above, for the corresponding housing stop 13, 14.

In accordance with at least one embodiment of the present invention, the stop bezels 16 (see FIGS. 2a, 2b, and 2c) or 16a and 16b (see FIGS. 2d, 2e and 2f) can preferably be configured to essentially match, or fit against, the contour of the housing stops 13, 14.

The valve seats 6, 7 can preferably be provided with gaskets 17 (see FIGS. 2a, 2b and 2c) or 17a and 17b (see FIGS. 2d, 2e and 2f) which can be held by housing insets or recesses 18, 19. The housing insets 18, 19 can preferably be inset into the valve housing 3 from the side opposite the extension 9. The gaskets 17 can, in accordance with at least one embodiment of the present invention, preferably provide a sealing surface between valve bodies 1, 2 and their corresponding valve seats 6, 7. From the same side, the two sliding valve bodies 1, 2 can preferably be actuated by means of a valve actuation system 20. The first sliding valve body 1 can preferably be actuated by means of a hollow rod 21, in which rod 21 there can preferably be an actuation rod 22 for the actuation of the second sliding valve body 2. The first sliding valve body 1 can preferably be provided, on the side opposite the second sliding valve body 2, and at some distance away, with a sealing cylinder 23 (shown enlarged in FIG. 1b) which in the flushing position can be flushed together with sealing seat 24 preferably through a toroidal chamber 25. The toroidal chamber 25 is preferably in communication with the leak cavity 8 by means of a connecting line 26, which connecting line 26 preferably runs between the hollow rod 21 and the actuation rod 22.

The operation of the double valve system described above can be easily understood by comparing FIGS. 1 and FIGS. 2a, 2b and 2c. In the position illustrated in FIGS. 1 and 2a, the valve actuation system 20 is preferably deactivated, and corresponding lifting cylinders 27 and 28 are preferably unpressurized. The sliding valve bodies 1, 2 can preferably be held in the closed position by a main spring 29 and a central spring 30. The central spring 30 can preferably act against a lifting cylinder spring 31 by means of a shaft stop 32. The stop for the main spring 29 can preferably be a spring hood cover 33.

To open the double valve system, a control pressure ps 1 can preferably move a main piston 34 of the lifting cylinder 27 downward, toward a cylinder cover 35, preferably against the force of the main spring 29. The first sliding valve body 1, after a partial stroke, can preferably come into contact with the second sliding valve body 2, and both of the valve bodies 1, 2 can then move into the open position (not shown). Preferably, when ps 1 is vented, the closed position of the valve bodies 1, 2 can once again be achieved by means of the main spring 29.

To lift the first sliding valve body i, shown in FIG. 2c, a control pressure ps 2 can preferably move the main piston 34, which main piston 34 can move the hollow rod 21 and thus the first sliding valve body 1 against the central spring 30 preferably into the stop position on the housing stop 13. A flushing of the first sliding valve body 1 and of the corresponding valve seat 6 can now preferably take place, as indicated by the arrows in FIG. 2c, as well as a flushing of the sealing cylinder 23 and of the corresponding sealing seat 24. Preferably, when ps 2 is vented, the closed position of valve body 1 can be achieved by means of the central spring 30.

To lift the second sliding valve body 2, shown in FIG. 2b, a control pressure ps 3 can preferably move a piston 36 of the lifting cylinder 28 toward a stop 37 on the cylinder cover. The shaft stop 32 of the central spring 30 can thereby be released, and the second sliding valve body 2 can preferably move toward the housing stop 14. The flushing of the second sliding valve body 2 with the corresponding valve seat 7 can now preferably take place, as indicated by the arrows in FIG. 2b. At the same time in which the second valve body 2 is cleaned, a lower shaft seal 38, and thus the outside surface of the tubular extension 9 can also be cleaned. Preferably, when ps 3 is vented, a lifting cylinder spring 31 can preferably move the second sliding valve body 2 into the closed position, preferably by means of the actuation rod 22 against the central spring 30.

An alternative embodiment of the present invention is shown in FIG. 1a. In accordance with this particular embodiment of the present invention, main piston 34 can preferably have a substantially cylindrical extension 34a, which extension 34a can be appropriately attached, such as with a weld, to a cylindrical body 34b. Cylindrical body 34b can preferably have an extension 34c which can extend towards stop 32. Of course, body 34b and extension 34a need not have a cylindrical shape, as other suitable configurations could be utilized. Cylindrical body 34b can also have an additional portion 26b which can preferably be disposed adjacent an additional cylindrical portion 26a, with passage 26 preferably running between portions 26a and 26b. In accordance with this particular embodiment, portions 26a and 26b can preferably be attached to one another by a weld, or other suitable attachment method. Alternatively, portion 26a may be a part of cylindrical body 34b, in which case body 34b could be a substantially solid piece and passage 26 could simply be a hole or other passage extending through cylindrical body 34b.

In accordance with the embodiment of the present invention shown in FIG. 1a, passage 26 can preferably serve to connect chamber 25 to leak cavity 8. Chamber 25 may be a toroidal, or possibly circular chamber, however, other configurations are possible.

The operation of the valve assembly shown in FIG. 1a is substantially as follows. Preferably, to open the double valve system, the control pressure ps 1 can preferably serve to move the main piston 34 downward, preferably against the force of the main spring 29. Main spring 29 can preferably be attached to spring hood cover 33, and spring hood cover 33 can preferably be attached, for example by welding, to extension 34c of cylindrical body 34b, or possibly to extension 34a. As piston 34 moves downward, extension 34a can preferably move downward along with piston 34. Since extension 34a can preferably be attached to cylindrical body 34b, as discussed above, cylindrical body 34b can also move with piston 34 and extension 34a. It follows that portions 26a and 26b can also move downward along with cylindrical body 34b.

Portion 26a can, in accordance with at least one embodiment of the present invention, be an extension of sealing cylinder 23. Thus, as portion 26a moves downward, sealing cylinder 23 can preferably move valve body 1 downward, preferably by means of hollow rod 21, until valve body 1 contacts valve body 2. Valve body 1 can preferably contact valve body 2 in the vicinity of surface 1a shown in FIG. 1a. As shown in FIG. 2d, a seal 17c, disposed in valve body 2, can preferably seal against a portion 1b of surface 1a of valve body 1. Further downward movement can thus move both valves 1, 2 preferably into their open position, i.e. both valves 1, 2 are out of contact with their corresponding valve seats 6, 7. To summarize, downward motions of main piston 34, extension 34a, cylindrical body 34b, portions 26a and 26b, sealing cylinder 23, and hollow rod 21 can preferably cause valve body 1 to move downwardly, or towards valve body 2, and to preferably contact valve body 2 and cause valve body 2 to move downward also. When ps 1 is vented, the valve bodies 1, 2 can preferably return to the closed position, preferably by means of main spring 29 and central spring 30.

Further, in accordance with the embodiment shown in FIG. 1a, the two valve bodies 1, 2 can be lifted in an upward direction, towards main piston 34, preferably for flushing purposes. Pressure ps 2 can preferably cause main piston 34 to move upwards, away from cylinder cover 35, and, as discussed above, extension 34a, cylindrical body 34b, portions 26a and 26b, sealing cylinder 23 and hollow rod 21 can all preferably move upwards along with main piston 34. Thus, valve body 1 can preferably be moved upwards into the flushing position until valve body 1 preferably makes contact with stop 13. That is, valve body 1 can be moved out of contact with valve seat 6. When ps 2 is vented, the closed position can preferably be restored to valve body 1, preferably by means of central spring 30.

Valve body 2, in accordance with the embodiment of the present invention shown in FIG. 1a, can preferably be lifted for purposes of flushing. Pressure ps 3 can lift piston 36, against the force of spring 31, towards stop 37. Piston 36 can preferably have an extension 36a which can move upwards with piston 36 towards stop 37. Extension 36a can preferably be attached, for example by welding, to actuation rod 22. Actuation rod 22 can preferably be attached to valve body 2 at or near point 22a, and actuation rod 22 can thus move upwards along with piston 36. Thus, valve body 2 can be moved into the flushing position. That is, valve body 2 can be moved out of contact with its corresponding valve seat 7. When ps 3 is vented, spring 31 can preferably cause actuation rod 22 to move valve body 2 into the closed position.

In accordance with the embodiment of the present invention shown in FIG. 1a, valve system can also preferably have an outlet 40a. Outlet 40a can preferably serve as a discharge for flushing agent and/or leakage.

Alternatively, valve body 2 could be actuated near a shaft 32a shown in FIG. 1a, instead of by piston 34 and piston 36. For example, actuation rod 22 could be moved upwards and downwards by means of an appropriate electric, hydraulic, pneumatic, or other suitable actuating device attached to shaft 32a. In accordance with this embodiment, valve body 2 could conceivably be opened independently of valve body 1 and closed independently of valve body 1.

FIG. 1c shows Section B from FIG. 1a which shows, in detail, sealing cylinder 23 and sealing seat 24.

In accordance with yet an additional embodiment of the present invention not shown here, a cylindrical portion 4b and discharge tube 40 could be elongated somewhat so as to preferably allow the entire valve body 2, and possibly even the entire valve body 1, to move a distance downwards, possibly into cylindrical portion 4b, for example, during the opening process.

It should be noted that FIGS. 1 and 1a show the valve system schematically, and thus the proportions of the individual components may vary as needed in accordance with various embodiments of the present invention. Therefore, as discussed immediately above, cylindrical portion 4b could be elongated somewhat in order to make room for valve body 2, and possibly for valve body 1. Further, shaft stop 32 could typically be located somewhat higher than shown in FIGS. 1 and 1a, which show shaft stop 32 schematically only. Shaft stop 32 could be located somewhat higher to preferably allow for a longer stroke of the valve bodies 1, 2.

Figure 2E:
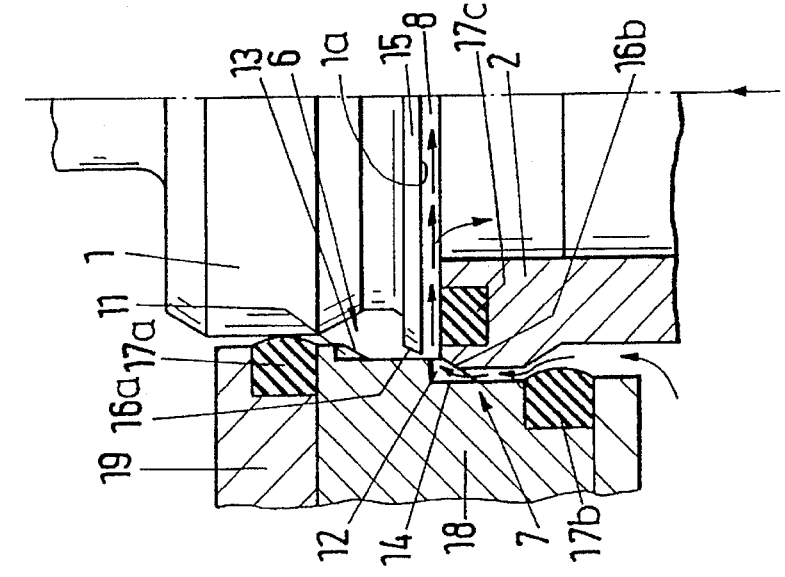
Figure 2F:
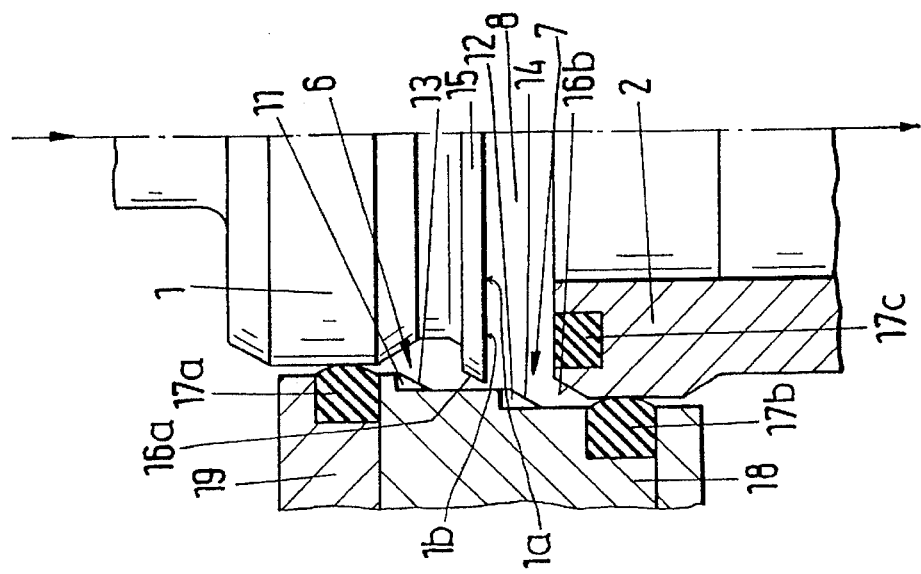

With reference to FIG. 2d, which shows the valve bodies 1, 2 in a closed position, FIG. 2e, which shows valve body 2 in the flushing position, and FIG. 2f, which shows valve body 1 in the flushing position, one preferred embodiment of the present invention may include the housing stops 13, 14 which can be configured as a ring or circular structure having angled projections. These projections can preferably have a contour which would fit against the contour of stop bezels (labeled 16a and 16b in FIGS. 2d, 2e, and 2f, in order to prevent the valve bodies 1, 2 from travelling too far upwards, towards cylinder cover 35. The projections of housing stops 13, 14 can preferably have spaces in between each projection which preferably correspond to the flushing agent passages 11, 12. Thus, when cleaning of the valve bodies 1, 2, is desired, flushing agent can conceivably be introduced through one or both line connections 4, 5, or possibly from another source, and the valve bodies 1, 2 can be moved into their flushing positions as described above. Thus, substantially all of the surfaces of each valve body 1 and 2 can be cleaned, including the surfaces (i.e. stop bezels 16a and 16b) which are in contact with stops 13 and 14.

In alternative embodiments of the present invention, one or even both of the stop bezels 16a, 16b could possibly, under some unique circumstances, be dispensed with.

As shown in FIGS. 2d, 2e and 2f, cavity 8 can preferably have varying volumes depending on the positions of valve bodies 1,2. For example, the volume of cavity 8 can preferably be the greatest when valve body 1 is in the flushing position, as shown in FIG. 2f. The volume of cavity 8 is preferably be the least when valve body 2 is in the flushing position, as shown in FIG. 2e. The volume of cavity 8, when both valve bodies 1,2 are in the closed position, as shown in FIG. 2d, can preferably have a value between the volumes of the two volumes described immediately hereinabove.

In accordance with yet an additional embodiment of the present invention, line 4 may have an outlet end at or near portion 4a (see FIG. 1a) and possibly an input end 4c (see FIG. 1a). Thus, valve body 2 could be moved downward, possibly by an additional piston, in some unique embodiment not shown here, which would allow valve body 2 to move downward independently of valve body 1, while valve body 1 remains closed. Therefore, fluid or other substance could possibly flow from 4c to 4a, or vice versa. Alternatively, valve body 1 and valve body 2 could both be moved together by piston 34, as discussed above, into their open position, and thus fluid or other substance could flow into lines 4 and 5 simultaneously.

In accordance with yet an additional embodiment of the present invention, the valve system shown in FIG. 1a could have two inputs, possibly for mixing two components. Thus, depending on the positions of valve bodies 1, 2, different mixes of the two components can preferably be produced. For example, end 4c and line 5 could serve as inputs for two different substances, and portion 4a could serve as an output.

In accordance with yet an additional embodiment of the present invention not shown here, valve body 1 and valve body 2 could each open independently of one another by means of their own pistons and pressures, as opposed to main piston 34 serving as the opening piston for both valve bodies 1, 2, as described above with reference to FIGS. 1 and 1a.

In accordance with yet an additional embodiment of the present invention, the valve system shown in the aforementioned Figures can preferably be a switching valve. That is, the valve bodies 1, 2 can either be in the open position, the closed position, or in their individual flushing positions. However, the valve system of the present invention could conceivably be configured to operate as a regulating valve system in which valve body 1 and valve body 2 could be positioned so as to partially open or partially close lines 4 and 5.

The various embodiments of the present invention could be used, for example, in confectionary machines where cleaning of the valve systems is often necessary due to sugar deposits or other residue remaining in the valve system after the passage of liquids or other confectionary substances. However, the embodiments of the present invention could have a variety of possible applications in other types of valve systems and are not to be taken as limited to use in confectionary machines and the like.

One feature of the invention resides broadly in the non-leaking switching double valve system consisting of two sliding valve bodies 1, 2 in a valve housing 3 with line connections 4, 5, whereby the two sliding valve bodies 1, 2 which can be actuated independently of one another are in contact in the closed position with valve seats 6, 7 in the valve housing 3, and are located at some distance one behind the other, forming a leak cavity 8 between them, and during the opening process, the first sliding valve body 1, before it leaves its valve seat 6, simultaneously reducing the size of the leak cavity 8, can be placed in contact with the second sliding valve body 2, which is provided with a tubular extension 9 which exits the valve housing 3 in a sealed manner and connects the leak cavity 8 to the environment of the valve system, characterized by the fact that the two sliding valve bodies 1, 2 can be moved independently of one another, each by a partial stroke opposite to the direction of the opening motion, into a flushing position, in which the sliding valve body 1 or 2 respectively is free from its valve seat 6 or 7 and is in contact with a housing stop 13 or 14 respectively provided with flushing agent passages 11 or 12 respectively.

Another feature of the invention resides broadly in the double valve system, characterized by the fact that the first sliding valve body 1 has a smaller diameter than the second sliding valve body 2.

Still another feature of the invention resides broadly in the double valve system, characterized by the fact that the first sliding valve body 1, on its side facing the second sliding valve body 2, has a stop flange edge 15 for the corresponding housing stop 13.

Yet another feature of the invention resides broadly in the double valve system, characterized by the fact that each of the two sliding valve bodies 1, 2 each has a stop bezel 16 for the corresponding housing stop 13, 14.

Still yet another feature of the invention resides broadly in the double valve system, characterized by the fact that the valve seats 6, 7 are provided with gaskets 17 which are held by housing insets 18, 19.

Yet still another feature of the invention resides broadly in the double valve system, characterized by the fact that the two sliding valve bodies 1, 2 can be actuated from one side by means of a valve actuation system 20.

Still yet another feature of the invention resides broadly in the double valve system, characterized by the fact that the first sliding valve body 1 can be actuated by means of a hollow rod 21 in which there is an actuation rod 22 for the second sliding valve body 2.

Another feature of the invention resides broadly in the double valve system, characterized by the fact that the first sliding valve body 1 has, on the side opposite the second sliding valve body 2, some distance away, a sealing cylinder 23 which, in the flushing position, can be flushed together with its sealing seat 24 through a toroidal chamber 25, and which is in communication with the leak cavity 8 by means of a connecting line 26 guided between the hollow rod 21 and the actuation rod 22.

Types of apparatus which may incorporate the present invention are disclosed by the following U.S. Pat. No. 5,161,456 to Ehrlinger et al. on Nov. 10, 1992, entitled "Apparatus for Mixing Fluid With a Liquid"; and U.S. Pat. No. 5,108,279 to Heckler et al. on Apr. 28, 1992, entitled "Stick Confection Extraction Apparatus".

Various types of valves in which the present invention may be utilized are disclosed in the following U.S. Pat. No. 5,193,345 to Cadeddu on Mar. 16, 1993, entitled "Distributor of a Fluid Under Pressure"; U.S. Pat. No. 4,820,408 to Sandig on Apr. 11, 1989, entitled "Double Valve Apparatus"; U.S. Pat. No. 4,252,070 to Benedick on Feb. 24, 1981, entitled "Double Valve Antileak System for Thermal Regeneration Incinerators"; U.S. Pat. No. 4,834,266 to Brewer et al. on May 30, 1989, entitled "Valve With Safety Vent Seal"; and U.S. Pat. No. 3,895,651 to Okada et al. on Jul. 22, 1975, entitled "Aseptic Valve".

Various types of leak-resistant valves and double valves in which the present invention may be utilized are disclosed in the following U.S. Pat. No. 5,311,900 to Jankowski on May 17, 1994, entitled "Leak Resistant Plug Valve"; U.S. Pat. No. 5,242,092 to Riis et al. on Sep. 7, 1993, entitled "Valve Arrangement for Transportable Container for Storing and Distributing Liquid Under Pressure"; U.S. Pat. No. 5,232,009 to Jankowski et al. on Aug. 3, 1993, entitled "Leak Resistant Plug Valve"; and U.S. Pat. No. 5,203,375 to Blanz on Apr. 20, 1993, entitled "Leveling Valve".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, European Patent Application No. 93 115 203.7, filed on Sep. 21, 1993, having inventors Wolfgang Bräckelmann, Norbert Schramm, and Frank Baumbach and Published European Patent Application No. 93 115 203.7, as well as any published equivalents, and other equivalents or corresponding applications, if any, in corresponding cases in Europe and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:
1. A double valve, said valve comprising:

a valve housing;

a first valve body disposed within said valve housing;

a second valve body disposed within said valve housing;

said first valve body and said second valve body being slidably displaceable;

said first valve body and said second valve body being slidably displaceable together to provide a closed position and an open position of said valve;

a first valve seat disposed within said valve housing;

said first valve body being in contact with said first valve seat in said closed position;

a second valve seat disposed within said valve housing;

said second valve body being in contact with said second valve seat in said closed position;

said first valve body being slidably displaceable between said closed position and a flushing position of said first valve body;

said second valve body being slidably displaceable between said closed position and a flushing position of said second valve body;

at least one input and at least one output;

said first valve body and said first valve seat and said second valve body and said second valve seat being disposed in tandem to permit at least a substantial portion of any flow between said at least one input and said at least one output to flow through said first valve seat and to also flow through said second valve seat;

said first valve body and said first valve seat and said second valve body and said second valve seat being disposed between said at least one input and said at least one output for permitting flow and stopping flow between said at least one input and said at least one output;

first means for limiting movement of said first valve body, said first means for limiting movement being disposed a distance from said first valve seat;

second means for limiting movement of said second valve body, said second means for limiting movement being disposed a distance from said second valve seat;

a cavity;

said cavity being disposed between said first valve body and said second valve body;

said cavity providing a flushing passage to permit flushing agent passing between said first valve body and said first valve seat and by said first means for limiting movement upon said second valve body being seated against said second valve seat, and to permit flushing agent passing between said second valve body and said second valve seat and by said second means for limiting movement upon said first valve body being seated against said first valve seat, and thus permitting flushing agent to enter said cavity and to exit said valve housing;

first means for moving said first valve body in a first direction of movement from said closed position to said open position;

second means for moving said first valve body in a second direction of movement from said closed position to said flushing position to free said first valve body from said first valve seat, said first valve body and said first valve seat being disposed away from one another in said flushing position;

said second direction of movement being opposite to said first direction of movement;

third means for moving said second valve body in a third direction of movement from said closed position to said open position;

fourth means for moving said second valve body in a fourth direction of movement from said closed position to said flushing position to free said second valve body from said second valve seat, said second valve body and said second valve seat being disposed away from one another in said flushing position;

said fourth direction of movement being opposite to said third direction of movement;

said first direction of movement being the same as said third direction of movement; and said second direction of movement being the same as said fourth direction of movement.

2. The valve according to claim 1 wherein:

said first means for limiting movement comprises:
first stop means disposed on said valve housing for preventing further movement of said first valve body in said second direction of movement, said first valve body being in contact with said first stop means in said flushing position of said first valve body; and said second means for limiting movement comprises:
second stop means disposed on said valve housing for preventing further movement of said second valve body in said fourth direction of movement, said second valve body being in contact with said second stop means in said flushing position of said second valve body.

3. The valve according to claim 2 wherein:

said first stop means comprises at least one passage disposed therein for permitting the flow of flushing agent through said first stop means to said first valve body; and said second stop means comprises at least one passage disposed therein for permitting the flow of flushing agent through said second stop means to said second valve body.

4. The valve according to claim 3 wherein:

said second moving means for moving said first valve body to said flushing position comprises means for permitting said first valve body to be moved independently of said second valve body; and said fourth moving means for moving said second valve body to said flushing position comprises means for permitting said second valve body to be moved independently of said first valve body.

5. The valve according to claim 2 wherein:

said first valve body comprises a first portion and a second portion disposed adjacent one another;

said first portion of said first valve body contacts said first valve seat in said closed position and said second portion of said first valve body contacts said first stop means in said flushing position of said first valve body;

said second valve body comprises a first portion and a second portion disposed adjacent one another; and said first portion of said second valve body contacts said second valve seat in said closed position and said second portion of said second valve body contacts said second stop means in said flushing position of said second valve body.

6. The valve according to claim 5 wherein:

said first valve body has a diameter;

said second valve body has a diameter; and said diameter of said first valve body is less than said diameter of said second valve body.

7. The valve according to claim 6 wherein:

said second portion of said first valve body comprises a circumferential surface portion and said first valve body comprises a surface disposed to face said second valve body, said circumferential surface portion being disposed concentrically about said surface of said first valve body;

said first stop means comprises a contact portion, said contact portion comprising an angled portion; and said circumferential surface portion comprises:
an angled portion disposed to contact said angled portion of said contact portion of said first stop means in said flushing position of said first valve body;

said second stop means comprises a contact portion, said contact portion of said second stop means comprising an angled portion;

said second portion of said second valve body comprises a circumferential surface portion; and said circumferential surface portion of said second valve body comprises:
an angled portion disposed to contact said angled portion of said contact portion of said second stop means in said flushing position of said second valve body.

8. The valve according to claim 7 wherein:

said first valve seat comprises:
gasket means for contacting at least a portion of said first portion of said first valve body in said closed position and for providing a seal between said first portion of said first valve body and said first valve seat in said closed position;

said second valve seat comprises:
gasket means for contacting at least a portion of said first portion of said second valve body in said closed position and for providing a seal between said first portion of said second valve body and said second valve seat in said closed position;

said valve housing comprises:
first means for receiving said gasket means of said first valve seat; and
second means for receiving said gasket means of said second valve seat.

9. The valve according to claim 7 wherein:

said first valve body and said second valve body are disposed adjacent one another;

said surface of said first valve body is a first surface;

said first valve body comprises a second surface, said second surface facing away from said second valve body;

said valve further comprises:
means for actuating said first valve body and said second valve body, said actuating means comprising said first moving means and said third moving means; and said actuating means is disposed adjacent said second surface of said first valve body.

10. The valve according to claim 9 wherein:

said actuating means comprises:
first rod means for moving said first valve body;
said first rod means is attached to said first valve body;
said first rod means comprises an orifice extending therethrough;

second rod means for moving said second valve body;
said second rod means is attached to said second valve body;
said second rod means is disposed in said orifice of said first rod means;
said valve further comprises:
  a sealing cylinder disposed adjacent said second surface of said first valve body and attached to said first rod means;
  a sealing cylinder seat disposed adjacent said second surface of said first valve body;
  chamber means for receiving flushing agent and for flushing said sealing cylinder and said sealing cylinder seat;
  passage means for connecting said chamber means to said cavity; and
  said passage means is disposed between said first rod means and said second rod means.

11. The valve according to claim 10 wherein:
said second valve body comprises:
  an extension, said extension being connected to said leak cavity;
  said extension for permitting leakage entering said leak cavity to exit said leak cavity;
  said extension comprises:
    a tubular shape; and
    an orifice extending therethrough.

12. The valve according to claim 11 wherein:
said actuating means further comprises:
  said second moving means and said fourth moving means;
  a first lifting cylinder and a second lifting cylinder;
  said first lifting cylinder comprises:
    piston means for moving said first valve body and said second valve body from said closed position to said open position, and for moving said first valve body from said closed position to said flushing position of said first valve body;
    first pressure inlet means for conducting pressurized medium into said first lifting cylinder to move said piston means towards said first valve body;
    second pressure inlet means for conducting pressurized medium into said first lifting cylinder to move said piston means away from said first valve body.

13. The valve according to claim 12 wherein:
said piston means comprises a portion extending from said piston means towards said first valve body;
said valve further comprises:
  a cylindrical body disposed between said piston means and said first valve body; and
  said cylindrical body is attached to said portion of said piston means and to said sealing cylinder.

14. The valve according to claim 13 wherein:
said valve further comprises:
  first spring means for biasing said first valve body in said closed position;
  a spring cover disposed between said first spring means and said piston means;
  second spring means for biasing said second valve body in said closed position;
  said piston means is a first piston means;
  said second lifting cylinder comprises:
    second piston means for moving said second valve body from said closed position to said flushing position;
    third pressure inlet means for conducting pressurized medium into said second lifting cylinder to move said second piston means away from said first valve body;
    third spring means disposed adjacent said second piston means, said third spring means for returning said second valve body from said flushing position to said closed position; and
    said second piston means comprises a portion extending from said second piston means to said second rod means, said portion of said second piston means being attached to said second rod means.

15. The valve according to claim 14 wherein said valve further comprises:
  discharge means for conducting flushing agent from said extension of said second valve body out of said housing; and
  said discharge means comprises a first end and a second end, said first end of said discharge means being connected to said extension of said second valve body, and said second end of said discharge means exiting said housing.

16. The valve according to claim 15 wherein:
said first valve body and said second valve body provide a plurality of volumes of said leak cavity, said plurality of volumes being disposed between said first valve body and said second valve body;
said plurality of volumes of said leak cavity comprises:
  a first volume in said closed position of said first valve body and said second valve body;
  a second volume in said flushing position of said first valve body;
  a third volume in said flushing position of said second valve body;
  said second volume is substantially greater than said first volume and said third volume; and
  said third volume is substantially less than said first volume and said second volume.

17. The valve according to claim 16 wherein:
said first receiving means comprises a recess;
said second receiving means comprises a recess;
at least a portion of said first surface of said first valve body is configured to contact at least a portion of said second valve body in said open position;
said second rod means comprises a first end and a second end;
said first end of said rod means is attached to said portion of said second piston means;
said second end of said rod means is attached to said second valve body;
said chamber means comprises a toroidal chamber;
said second valve body comprises seal means disposed to contact at least a portion of said first surface of said first valve body;
said seal means for sealing said second valve body against said first surface of said first valve body in said open position of said first valve body and said second valve body.

18. A double valve, said valve comprising:
a valve housing;
a first valve body disposed within said valve housing;
a second valve body disposed within said valve housing;
said first valve body and said second valve body being slidably displaceable together to provide a closed position and an open position of said valve;
a first valve seat disposed within said valve housing;
said first valve body being in contact with said first valve seat in said closed position;

a second valve seat disposed within said valve housing;

said second valve body being in contact with said second valve seat in said closed position;

said first valve body being slidably displaceable between said closed position and a flushing position of said first valve body;

said second valve body being slidably displaceable between said closed position and a flushing position of said second valve body;

at least one input and at least one output;

said first valve body and said first valve seat and said second valve body and said second valve seat being disposed in tandem to permit at least a substantial portion of any flow between said at least one input and said at least one output to flow through said first valve seat and to also flow through said second valve seat in said open position of said valve;

said first valve body and said first valve seat and said second valve body and said second valve seat being disposed between said at least one input and said at least one output for permitting flow and stopping flow between said at least one input and said at least one output;

a cavity;

said cavity being disposed between said first valve body and said second valve body;

said cavity for permitting flushing agent entering said cavity to exit said valve housing;

first means for moving said first valve body in a first direction of movement from said closed position to said open position;

second means for moving said first valve body in a second direction of movement from said closed position to said flushing position to free said first valve body from said first valve seat, said first valve body and said first valve seat being disposed away from one another in said flushing position;

third means for moving said second valve body in a third direction of movement from said closed position to said open position;

fourth means for moving said second valve body in a fourth direction of movement from said closed position to said flushing position to free said second valve body from said second valve seat, said second valve body and said second valve seat being disposed away from one another in said flushing position;

first stop means disposed on said valve housing for preventing further movement of said first valve body in said second direction of movement, said first valve body being in direct contact with said first stop means in said flushing position of said first valve body;

second stop means disposed on said valve housing for preventing further movement of said second valve body in said fourth direction of movement, said second valve body being in direct contact with said second stop means in said flushing position of said second valve body;

said first stop means comprises at least one passage disposed therein for permitting the flow of flushing agent through said first stop means to said first valve body and into said cavity; and said second stop means comprises at least one passage disposed therein for permitting the flow of flushing agent through said second stop means to said second valve body and into said cavity.

19. The valve according to claim 18 wherein:

said first valve body comprises a first portion and a second portion disposed adjacent one another;

said first portion of said first valve body contacts said first valve seat in said closed position and said second portion of said first valve body contacts said first stop means in said flushing position of said first valve body;

said second valve body comprises a first portion and a second portion disposed adjacent one another; and said first portion of said second valve body contacts said second valve seat in said closed position and said second portion of said second valve body contacts said second stop means in said flushing position of said second valve body.

20. The valve according to claim 19 wherein:

said second direction of movement is opposite to said first direction of movement;

said fourth direction of movement is opposite to said third direction of movement;

said first direction of movement is the same as said third direction of movement; and said second direction of movement is the same as said fourth direction of movement.

* * * * *

UNITED STATES PATENT AND TRADEMARK OFFICE
CERTIFICATE OF CORRECTION

PATENT NO. : 5,645,102
DATED : July 8, 1997
INVENTOR(S) : Wolfgang BRÄCKELMANN, Norbert SCHRAMM and Frank BAUMBACH It is certified that error appears in the above-identified patent and that said Letters Patent is hereby corrected as shown below:

In column 4, line 56, after 'body', delete "i," and insert --1,--.

In column 11, line 51, Claim 5, after 'claim', delete "2" and insert --4--.

In column 12, line 47, Claim 9, after 'claim', delete "7" and insert --8--.

Signed and Sealed this

Fifteenth Day of September, 1998

Attest:

BRUCE LEHMAN

Attesting Officer      Commissioner of Patents and Trademarks